W. L. SCHELLENBACH.
TAPER ATTACHMENT FOR LATHES.
APPLICATION FILED AUG. 7, 1913.

1,100,259. Patented June 16, 1914.
2 SHEETS—SHEET 1.

Witnesses
Inventor
William L. Schellenbach
By C. W. Miles
Attorney

W. L. SCHELLENBACH.
TAPER ATTACHMENT FOR LATHES.
APPLICATION FILED AUG. 7, 1913.
1,100,259.
Patented June 16, 1914.
2 SHEETS—SHEET 2.
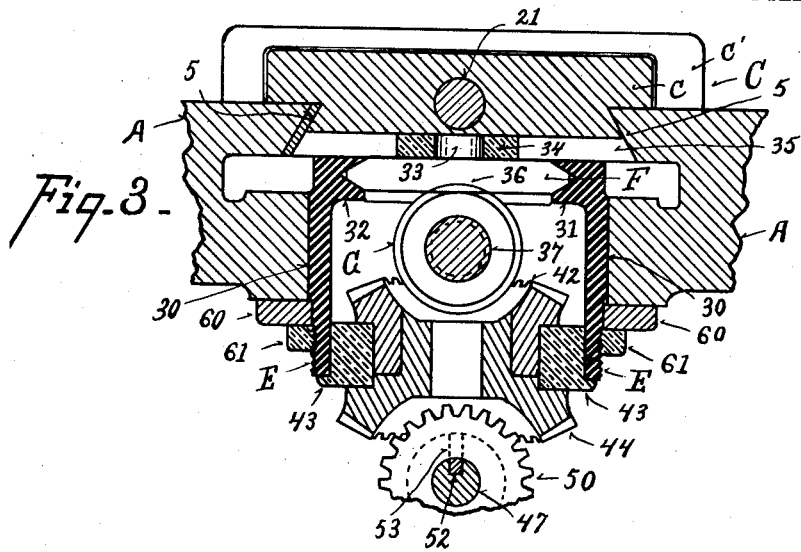
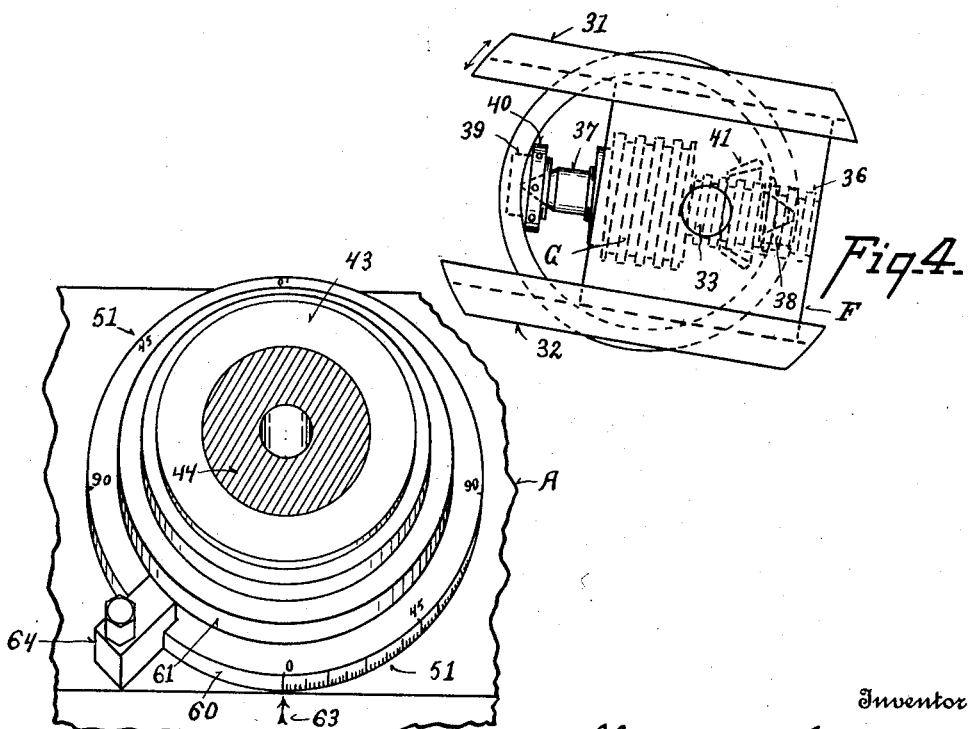

UNITED STATES PATENT OFFICE.

WILLIAM L. SCHELLENBACH, OF HARTWELL, OHIO.

TAPER ATTACHMENT FOR LATHES.

1,100,259.   Specification of Letters Patent.   Patented June 16, 1914.

Application filed August 7, 1913. Serial No. 783,495.

*To all whom it may concern:*

Be it known that I, WILLIAM L. SCHELLENBACH, a citizen of the United States, residing at Hartwell, in the county of Hamilton and State of Ohio, have invented certain new and useful Improvements in Taper Attachments for Lathes, of which the following is a specification.

My invention relates to improvements in taper attachment for lathes.

One of its objects is to provide an improved taper attachment adapted to be housed in the tool carriage and to receive motion from the gears of the tool carriage apron.

Another object is to provide a taper attachment adapted to be fitted to tool carriages of usual construction.

Another object is to provide for selectively feeding the cross feed member of the tool carriage either by the usual cross feed mechanism or by means of the taper attachment.

Another object is to provide improved means to adjust and regulate said taper attachment mechanism, and to shift it into and out of operative relation with the carriage feeding mechanism.

Figure 1:
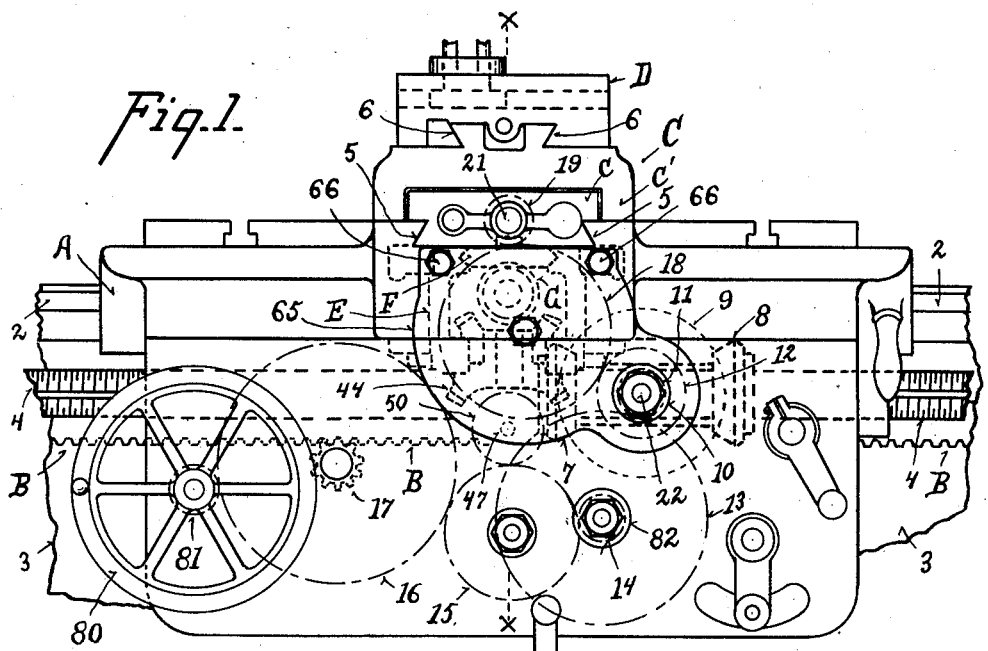
Figure 2:
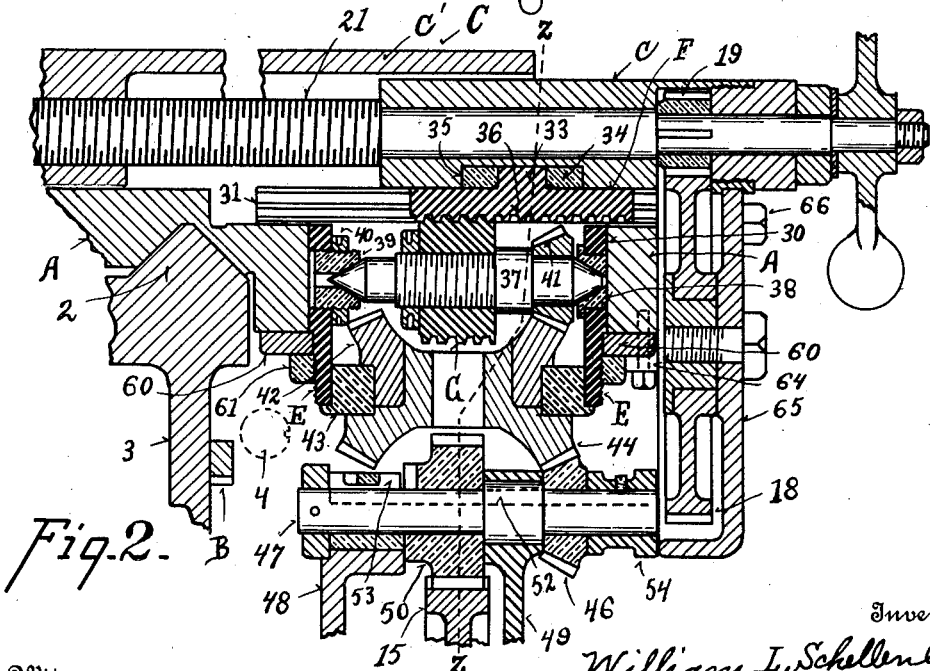

My invention also comprises certain details of form, combination and arrangement, all of which will be more fully set forth in the description of the accompanying drawings, in which:

Figure 1 is a front elevation of a lathe tool carriage embodying my invention. Fig. 2 is a vertical section through the same on line *x x* of Fig. 1. Fig. 3 is a section through the same on line *z z* of Fig. 2. Fig. 4 is a top plan view of the taper attachment shell and slide detached. Fig. 5 is a perspective detail, partly in section, illustrating the lower portion of the taper attachment shell, its index plate and clamping mechanism.

In the accompanying drawings illustrating the preferred embodiment of my invention, A represents the longitudinally moving member of the tool carriage frame, which is seated upon ways 2 on the bedplate 3 of the lathe, and is adapted to be fed longitudinally thereon by means of gears receiving motion from a lead screw 4 or equivalent member. Mounted upon transverse ways or guides 5 on the member A is a tool carriage member C adapted to be fed by power transversely of the lathe bed, and mounted in guides 6 on the member C is a tool holder D adapted to be fed by hand. Any of the usual forms or combinations of mechanism employed to feed or drive the tool carriage members A C may be employed. As illustrated two beveled gears 7 and 8 are splined to the lead screw 4 and are adapted to be alternately or selectively engaged with a bevel gear 9 to drive it in either direction. The shaft 22 of gear 9 is adapted to be clutched by a knurl 10 to the hub of gear 12 which is loosely journaled on said shaft. The gear 11 is keyed to shaft 22 and through a train of gears 13, 14, 15, 16, 17 is adapted to engage the usual rack B on the lathe bed to feed the carriage member A longitudinally upon the lathe bed. Gear 17 is adapted to slide endwise to engage and disengage the rack B. The gear 12 by means of a train of gears 18 19 is adapted to drive the cross feed screw 21 to feed the carriage member C transversely of the lathe bed. The foregoing parts may all be of usual construction.

My improved taper attachment is preferably supported or mounted upon a shell or frame E which is journaled upon a vertical axis in a cylindrical recess 30 in the forward portion of the carriage member A, and which recess is adapted to be formed to receive such taper attachment in tool carriages of usual construction. The lower portion of the shell E is a cylindrical tube externally fitting the recess 30. Above the recess 30 and preventing said shell passing through said recess, are parallel cross bars 31 32 provided on their adjacent faces with V-shaped ways or guides to receive and guide a traveling head or plate F which has an upwardly projecting stud 33 which journals in a sliding block or plate 34, which is adapted to travel parallel to the lathe bed in a recess 35 in the member C.

G represents a worm which engages a rack 36 on the under side of plate F. Said worm is mounted upon a shaft 37 having conical ends journaled in conical bearings 38 39 seated in the walls of the shell E. The bearing 39 is adjustable to compensate for wear and adapted to be locked to adjusted position by a collar or nut 40.

Shaft 37 carries a beveled gear 41 which is driven by a beveled gear 42 journaled in a collar 43 seated in the lower end of shell E. A beveled gear 44 below the collar 43 is locked by its hub to the hub of gear 42 so that gears 42 and 44 will travel together.

A beveled gear 46 keyed to shaft 47 drives gear 44. The shaft 47 is journaled in brackets 48 49 carried by member A, and a spur gear 50 loose on shaft 47 receives motion from gear 15 carried by member A. A key 52 has a projecting clutch member 53 adapted to lock the gear 50 to shaft 47. The opposite end of said key is attached to a knurl 54 by means of which the key 52 and clutch member 53 are shifted endwise relative to shaft 47 to clutch or release the gear 50.

The shell E is locked in place within the recess 30 by means of a ring or collar 60 keyed to the shell and a nut or threaded collar 61 forcing the ring 60 up against a shoulder on shell E. The ring 60 is graduated or provided with a scale divided into degrees on diametrically opposite quarters of the face of said ring, and either of said scales may be brought into position with reference to the indicator arrow 63 on the member A. One of said scales is employed for turning tapers which are larger toward the lathe headstock, and the other for tapers larger toward the tail-stock. A clamp 64 serves to lock the ring 60 to its adjusted position, and to release it for readjustment.

As illustrated the member C is composed of two parts $c$ $c'$, one of which $c$ is stationary with reference to member A while the part $c'$ is being driven by the cross feed screw by means of the gears 18, 19, said part $c$ being locked relative to member A by the gear 18 and a detachable housing 65 by which said gear is carried. Said housing 65 as shown in Fig. 2 also serves to lock the knurl 54 in position to disengage the clutch member 53 from the gear 50, thus preventing the taper attachment and lead screw being simultaneously operated. In the position Fig. 2 the lead screw is adapted by its rotation to feed the part $c'$ transversely of the lathe bed. When it is desired to use the taper attachment, the bolts 66 are removed permitting the housing 65 and gear 18 to turn on the shaft 22 as an axis, thereby releasing gear 19 from engagement with gear 18 and releasing the part $c$ from member A, and permitting parts $c$ $c'$ to travel together, and the travel of the slide F in one direction and the block 33 in its recess 35 in another direction thereby causing a cross feed or movement of the parts $c$ $c'$ in definite ratio to the longitudinal travel of member A on the lathe bed, thus providing for the turning of tapers of varying degree according to the angular adjustment of the guide bars 31 32 of shell E with reference to the member A. A half rotation of the shell E causes a reversal in direction of feed of the slide F. A readjustment of housing 65 to position shifts the taper attachment out of gear and permits the lead screw to be again driven through gears 12, 18, 19.

A hand wheel 80 carrying a gear 81 in mesh with the gear 16 enables the gears 14, 15, 16, 17, and 50 to be fed by hand after the knurl 82 has been shifted to release the gear 14 from its connection with power driven gear 13, thus providing for the simultaneous feed of member A and member C by means of the taper attachment, either by power or by hand.

The mechanism herein illustrated and described is capable of considerable modification without departing from the principle of my invention.

Having described my invention, what I claim is:

1. In a lathe, a tool carriage movable longitudinally of the lathe bed, mechanism to feed said tool carriage, a cross-slide mounted upon said tool carriage and movable transversely of the lathe bed, a frame carried by and pivotally adjustable relative to said tool carriage, a slide mounted upon and adapted to travel across the axis of said pivoted frame, mechanism carried by said pivoted frame and driven in unison with the feeding mechanism of said tool carriage to feed said slide, and mechanism connecting said slide with said cross-slide.

2. In a lathe, a tool carriage movable longitudinally of the lathe bed, mechanism to feed said tool carriage, a cross-slide carried by said tool carriage and movable transversely of the lathe bed, a frame carried by and pivotally adjustable relative to said tool carriage, said frame being provided with parallel guides, a slide movable along said guides and operatively connected to said cross-slide, and gear mechanism carried by said pivotally adjustable frame movable in unison with the feeding mechanism of said tool carriage to drive said slide in definite ratio to the movements of said tool carriage.

3. In a lathe, a tool carriage movable longitudinally of the lathe bed, mechanism by which said tool carriage may be fed by hand or by power, a cross-slide mounted upon said tool carriage and movable transversely of the lathe bed, a frame pivotally supported by and adjustable relative to said tool carriage, a slide carried by and adjustable transversely to the axis of said frame, mechanism carried by said frame and movable in unison with the feeding mechanism of said tool carriage when either hand or power driven, to actuate said slide, and means to operatively connect said slide with said cross-slide.

4. In a lathe, a tool carriage movable longitudinally of the lathe bed, mechanism to feed said tool carriage, a cross-slide mounted upon said tool carriage and movable transversely of the lathe bed, a frame carried by and pivotally adjustable relative to said tool carriage, a slide mounted in ways on said frame and adjustable transversely of the axis of said frame, and gear mechanism receiving motion from said tool carriage feed mechanism to feed said slide, said slide being operatively connected to said cross-slide.

5. In a lathe, a tool carriage movable longitudinally of the lathe bed, mechanism to feed said tool carriage, a cross-slide mounted upon said tool carriage and adapted to be fed transversely of the lathe bed, a lead screw to feed said cross-slide, mechanism receiving motion from said tool carriage feed mechanism adapted to be connected to and disconnected from said lead screw to drive said lead screw, a frame pivotally mounted upon said tool carriage, means to adjust and lock said frame to varying positions of angularity with reference to said tool carriage, a slide mounted in ways of said frame and adjustable thereon transversely of the axis of said frame, mechanism to operatively connect said slide with said cross-slide, and gear mechanism to be connected to and disconnected from said tool carriage feed mechanism to feed said slide relative to said frame, said lead screw and slide being adapted to be interchangeably employed to feed said cross-slide.

6. In a lathe, a tool carriage movable longitudinally of the lathe bed, mechanism to feed said tool carriage, a cross-slide carried by said tool carriage and movable transversely of the lathe bed, ways parallel with the lathe bed formed in said cross-slide, a sliding block movable parallel with the lathe bed on said ways, a frame having ways, means to adjust and lock said frame and its ways to varying degrees of angularity relative to said tool carriage, a slide movable on the ways of said frame, gear mechanism receiving motion from said tool carriage feeding mechanism, and a stud pivotally connecting said slide and said sliding-block to feed said cross-slide through said slide transversely to the lathe bed in definite ratio to the movements of said tool carriage.

7. In a lathe, a tool carriage movable longitudinally of the lathe bed, mechanism to feed said tool carriage, a cross-slide carried by said tool carriage and movable transversely of the lathe bed, a taper attachment comprising a frame pivotally supported relative to said tool carriage and adapted to be adjusted and locked to varying positions of angularity, a slide mounted in ways on said frame and movable transversely of the axis of said frame, said slide being operatively connected to said cross-slide and provided with a rack, a worm journaled to said frame and engaging the rack of said slide, and gear mechanism transmitting motion from said tool carriage feed mechanism to the shaft of said worm.

8. In a lathe in combination with a tool carriage, a cross-slide, and mechanism to drive said tool carriage, a taper attachment comprising a frame pivotally mounted upon and angularly adjustable relative to said tool carriage, a train of gears carried by said frame to receive motion from the tool carriage feeding mechanism, a shaft journaled to said frame and provided with a worm, said shaft receiving motion from said train of gears, means to engage and disengage said train of gears with said tool carriage feeding mechanism, a slide mounted in ways on said frame and provided with a rack engaging said worm, and mechanism to operatively connect said slide with said cross-slide.

9. In a lathe, in combination with a tool carriage, a cross-slide, and mechanism to drive said tool carriage, a taper attachment comprising a frame pivotally mounted upon and angularly adjustable relative to said tool carriage, a train of gears carried by said frame to receive motion from said tool carriage driving mechanism, a shaft journaled to said frame and provided with a worm, said shaft receiving motion from said train of gears, a slide mounted in ways on said frame and provided with a rack engaging said worm, and a block pivotally connected to said slide and adapted to slide in ways carried by said cross-slide.

In testimony whereof I have affixed my signature in presence of two witnesses.

WILLIAM L. SCHELLENBACH.

Witnesses:
C. W. MILES,
W. THORNTON BOGERT.